Jan. 2, 1951 W. P. WILLS 2,536,245
MEASURING AND CONTROLLING APPARATUS
Filed Jan. 10, 1947 2 Sheets-Sheet 1
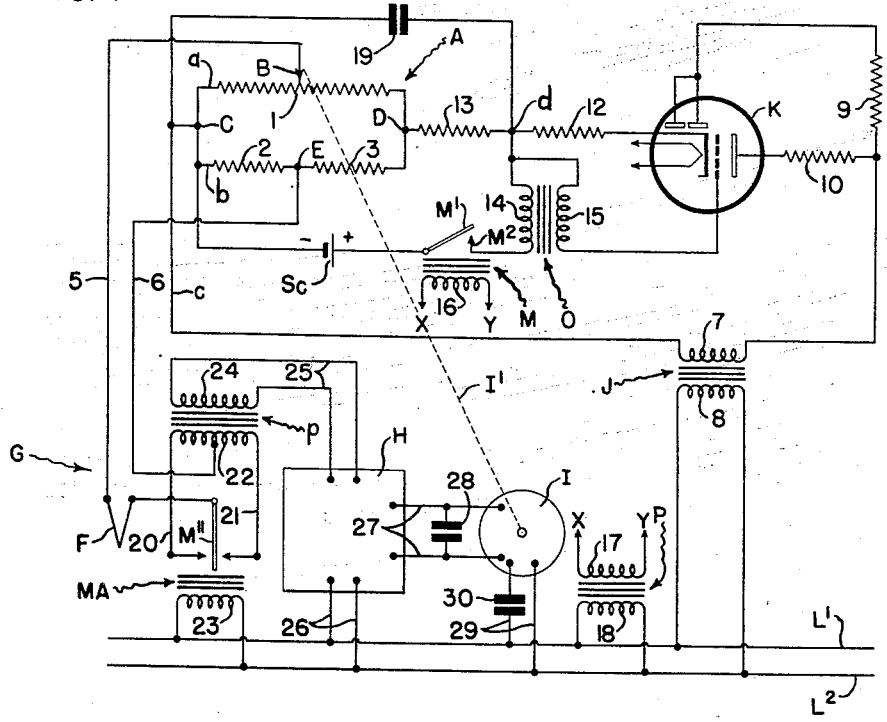
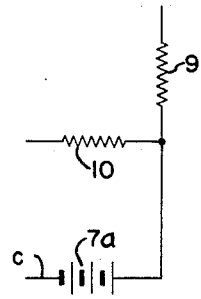
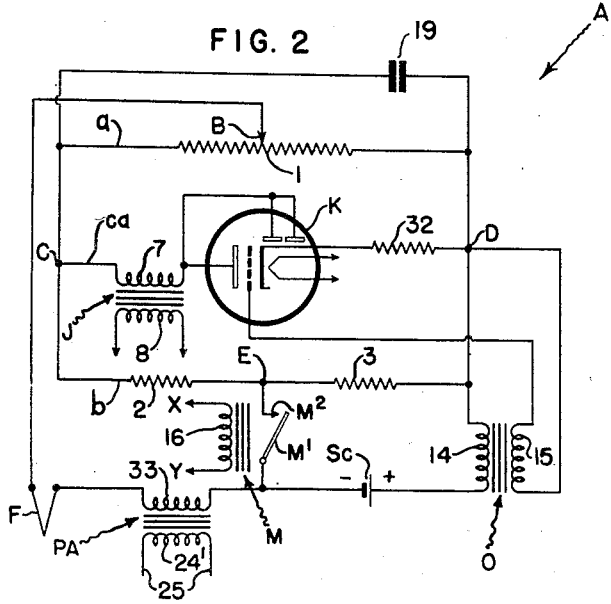
*INVENTOR.*
WALTER P. WILLS
BY Arthur H. Swanson
ATTORNEY Jan. 2, 1951 W. P. WILLS 2,536,245
MEASURING AND CONTROLLING APPARATUS
Filed Jan. 10, 1947 2 Sheets-Sheet 2

INVENTOR.
WALTER P. WILLS
BY Arthur H. Swanson
ATTORNEY

Patented Jan. 2, 1951

2,536,245

UNITED STATES PATENT OFFICE 2,536,245

MEASURING AND CONTROLLING APPARATUS

Walter P. Wills, Philadelphia, Pa., assignor, by mesne assignments, to Minneapolis-Honeywell Regulator Company, Minneapolis, Minn., a corporation of Delaware Application January 10, 1947, Serial No. 721,418

17 Claims. (Cl. 318—28)

The general object of the present invention is to provide novel and effective means for maintaining a small and approximately constant unidirectional current flow in a circuit including resistance. A specific object of the invention is to combine a standard cell, electronic valve means, a circuit interrupter, a source of alternating current and a substantially fixed or non-variable resistance, so as to maintain a potential drop across said resistance which is in approximately constant proportion to the voltage of the standard cell, without drawing enough current from said cell to be practically objectionable.

The novel means devised by me for the attainment of the above-mentioned objects of my invention are well adapted for use in supplying energizing current to a potentiometric measuring circuit. The invention thus makes it practically feasible to energize suitably a potentiometric measuring circuit without the use of a dry cell, heretofore customarily used to energize such a circuit. The use of the present invention also eliminates the necessity for the standardizing or recalibrating means heretofore employed to adjust a variable resistance in the potentiometer circuit from time to time so as to compensate for the progressive decrease in the voltage of the energizing cell occurring during the operative life of the cell.

Another specific object of the present invention is to provide a novel potentiometric measuring circuit in which the energizing cell heretofore customarily employed is replaced by my improved means for supplying energizing current, and in which the measuring circuit energization is subjected to continuous standardization by standardizing means differing widely and advantageously from the periodically operating standardizing mechanisms commonly employed heretofore. In particular, my novel standardizing means maintains the measuring circuit in its standardized condition at all times, without interfering at any time with the normal measuring use of the circuit.

The various features of novelty which characterize my invention are pointed out with particularity in the claims annexed to, and forming a part of this specification. For a better understanding of the invention, however, its advantages, and specific objects attained by its use, reference should be had to the accompanying drawings and descriptive matter in which I have illustrated and described preferred embodiments of the invention.

Of the drawings—

Fig. 1 is a diagram illustrating potentiometric measuring apparatus including one embodiment of my invention;

Fig. 1a illustrates a modification of Fig. 1;

Fig. 2 is a diagram illustrating potentiometric measuring apparatus including a second embodiment of my invention.

Figure 3:
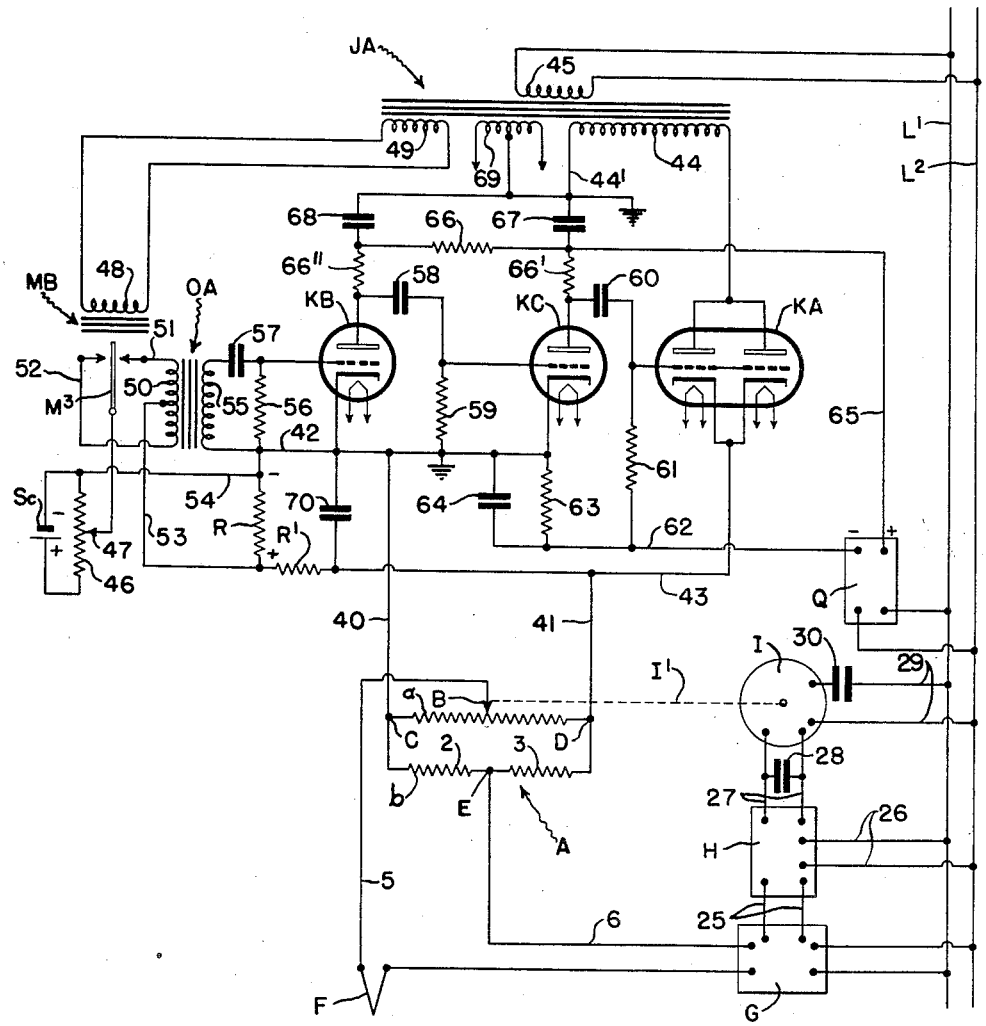
Fig. 3 is a diagram illustrating potentiometric measuring apparatus including a third embodiment of my invention.

In the drawings, and referring first to the arrangements shown in Fig. 1, A represents a measuring circuit in the form of a split potentiometer or bridge circuit comprising a branch $a$ including a slide wire resistance 1 in engagement with which is a slider contact B, a second branch $b$ including resistances 2 and 3, and an energizing branch $c$. The split potentiometer measuring circuit shown is of conventional type, except in respect to the energizing means included in the energizing branch $c$ of the circuit. In Fig. 1, as in a conventional potentiometer circuit, one end of the energizing branch $c$ is connected to the left end of each of the other potentiometer circuit branches $a$ and $b$ at C, and the second end of the energizing branch is connected to the right ends of said branches $a$ and $b$ at the point D. In effect, the energizing branch $c$ is connected in series with each of the other two branches, the latter being connected in parallel with one another.

The potentiometer circuit A is connected in a circuit network which includes a measuring circuit branch comprising a conductor 5 connected to the slider contact B, and a conductor 6 connected to a fixed point E in the potentiometer circuit between the resistances 2 and 3. In addition to the conductors 5 and 6, the measuring circuit branch includes the source of voltage to be measured, shown in a thermocouple F, and a device G which is responsive to the direction and amplitude of current flow in the measuring circuit branch.

In some cases the device G may take the form of a deflecting galvanometer. However, to obtain full advantage of the measurement accuracy and speed obtainable with the present invention, the device G is advantageously of a type to control the operation of a reversible rebalancing motor I through an electronic amplifying and motor drive system H such as those included in the extensively used conversion type potentiometer disclosed and claimed in my Patent 2,423,540 of July 8, 1947, granted on an application filed December 1, 1941, and also disclosed in my Patent 2,385,481, granted September 25, 1945.

In the balanced condition of the potentiometer circuit shown in Fig. 1, the voltage between the contact B and point E is equal and opposite to the voltage of the thermocouple F so that there is no current flow through the measuring circuit branch. When the circuit is thus balanced, a thermocouple voltage change in either direction will unbalance the potentiometer circuit. When this occurs, the device G operates through the control apparatus H to effect operation of the motor I in the direction and to the extent required for the adjustment of the contact B into a position in which the potentiometer circuit is rebalanced. The motor I thus adjusts the slider contact B through the diagrammatically illustrated mechanical connection I'. In respect to its operation, structure and arrangement, the potentiometer apparatus shown in Fig. 1 presents nothing claimed as novel herein, except in respect to the apparatus, in, and associated with, the energizing branch c.

The potentiometer energizing means employed in the apparatus shown in Fig. 1 may comprise a battery or other source of unidirectional current, or it may comprise a source of alternating current, which, as shown, is the secondary winding 7 of a transformer J. One terminal of the winding 7 is connected to the potentiometer circuit at the point C. Resistances 9 and 10 connect the second terminal of the winding 7 to the diode anodes and triode anode, respectively, of a duo-diode, high mu triode tube K, and resistances 12 and 13 are connected in series between the cathode of the tube K and point D of the potentiometer circuit. The resistances 12 and 13 are connected in series at a point d. The primary winding 8 of the transformer J has its terminals connected to alternating current conductors L' and L², which supply alternating current of customary commercial frequency and voltage: for example, 60 cycles per second and 115 volts.

With this arrangement, the current flow supplied by the transformer secondary winding 7 to the potentiometer circuit A is pulsating due to the rectifying action of the tube K. A condenser 19 connected between the points d and C smooths out the pulsations, however, so that the energizing current flow through the potentiometer circuit is practically continuous and substantially free from disturbing ripple. To insure complete freedom from ripple, the transformer J of Fig. 1 may be replaced by a battery such as the battery 7a of Fig. 1a, in which case the condenser 19 may be dispensed with, or a rectifier and filter may be employed in conjunction with the transformer J to produce a continuous direct current energizing voltage having freedom from ripple comparable to that of the battery 7a.

A control or standardizing circuit branch is connected at one end to the potentiometer circuit at the point C and is connected at its other end to the point d at which the terminals of the resistors 12 and 13 are connected. That branch includes a standard cell Sc, the reed M' and associated contact M² of a vibrator M, and the primary winding 14 of a transformer O. The secondary winding 15 of the transformer O connects the control grid of the valve K to the point d. The vibrator M comprises an electromagnet having its energizing winding 16 connected by conductors X and Y, partially shown, to the secondary winding 17 of a transformer P having its primary winding 18 connected across the supply conductors L' and L². The alternating current flow through the electromagnet winding 16 of the vibrator M causes the reed M' to vibrate into and out of engagement with the contact M². The windings of the transformers P, J and O and the vibrator coil 16 are so relatively connected and arranged that the potential difference between the control grid and cathode of the tube K is increased or decreased by current flowing through the transformer secondary winding 15, depending on the direction in which that current flows.

Current flow through the winding 15 occurs when the difference in potential between the points C and d is not exactly equal to the voltage of the standard cell Sc and causes a pulsating flow through the standard cell Sc and transformer primary 14. The winding 15 is so arranged that when the current through the standard cell is from the point d to the point C, it decreases the energizing current by augmenting the bias action of the resistance 12 and making the control grid of the tube K more negative relative to the cathode of the tube than when there is no current flow through the winding 15. Conversely, when the flow through the standard cell is from the point C to the point d, the transformer O acts to make the control grid of the tube K less negative relative to the cathode of the tube, and thus increases the current flow through, and hence, the potential drop in, the fixed resistance comprising the resistor 13 and the potentiometer circuit between the points C and D.

The action of the transformer O occurs only when the current through the potentiometer circuit between the points C and D is larger or smaller than normal, and provides regulation with a drooping characteristic, so that it is theoretically incapable of maintaining the current flow through the bridge exactly constant. In practice, however, the apparatus can be proportioned and arranged so that in regular use the difference between the actual energizing current flow through the potentiometer circuit would never differ from the desired value except by a relatively minute amount even though the transformer O were omitted. By suitably proportioning and arranging the parts, the regulator action of the transformer O, when used as shown in Fig. 1, will prevent the difference between the actual and desired values of the energizing current from being large enough to have practical significance, without subjecting the standard cell Sc to an objectionably large current drain.

When the element G is of the conversion element type illustrated in Fig. 1, it comprises a vibrator MA having a vibrating armature or reed M'' alternatively engaging two stationary contacts at opposite sides of the reed. One of the stationary contacts is connected by a conductor 20 to one terminal of an inductive winding 22, and the other stationary contact is connected by a conductor 21 to the second terminal of the winding 22. The armature is oscillated with the frequency of the voltage across the supply conductors L' and L² by means of an electromagnet having an energizing coil 23. The latter is connected across the supply conductors L' and L².

The conductor 5 connects the slider contact B to the reed M'' through the thermocouple F, and the conductor 6 connects the bridge circuit point E to the midpoint of the winding 22. The latter forms the current inducing, or primary, winding of a transformer p, which has a secondary coil 24 in which an alternating current is induced by the current flowing alternately into the winding 22 through its opposite end terminals from the conductors 20 and 21. The frequency of the alternating current induced in the winding 24 is that of the voltage across the supply conductors L' and L², and the induced current is of one phase, or of a phase displaced 180° from said phase, accordingly as the flow of the unidirectional current between the slider contact B and bridge circuit point E is in one direction or in the opposite direction. The terminals 25 of the transformer winding 24 are connected to the input terminals of the voltage amplifying and motor drive system H.

The latter has energizing terminals 26 connected to the supply conductors L' and L², and has output terminals 27 connected to the control winding of the reversible motor I. The terminals 27 are connected together by condenser 28. The motor I has a power winding with terminals 29 which ar connected to the supply conductors L' and L². One of those terminals includes a condenser 30 connected in series therewith. Through the diagrammatically illustrated mechanical connection I', the motor I adjusts the contact B along the slide wire resistor 1 in one direction or the other, depending on the direction of current flow through the thermocouple F. Further explanations concerning the elements G, H and I seem unnecessary herein.

The duo-diode high mu triode tube K is a commercially available tube well adapted for its use illustrated in Fig. 1. The duo-diode section of the tube forms a reliable element for supplying unidirectional potentiometer energizing current at a constant rate under steady operating conditions. The triode section of the tube augments the current supplied by the diode section to an extent which varies with changes in operating conditions tending to vary the potentiometer energizing current. In ordinary practice, variations in the voltage across the supply conductors L' and L² usually are the principal and only appreciable cause of fluctuations in the energizing current. When such a fluctuation occurs and results in a current flow through the primary winding 14 of the transformer O, the high gain triode promptly decreases or increases its anode current so as practically instantaneously to restore the energizing current to a value differing only very slightly from the desired value.

Owing to the ripple-eliminating effect of the condenser 19, the current flow through the thermocouple in Fig. 1 is sufficiently smooth and continuous to require the creation by the converter element G of an alternating current signal for amplification in the device H. It is possible, also, to combine a potentiometer circuit and continuous standardizing apparatus, analogous to that shown in Fig. 1, in such manner that the vibrator employed in the standardizing portion will also be operative to create the required alternating current signal from the thermocouple current, making it unnecessary to provide the converter element G. One form of apparatus adapted for operation in the manner just described is illustrated in Fig. 2.

The vibrator MA of Fig. 1 is eliminated from the circuit of Fig. 2, and the potentiometer bridge circuit A of Fig. 2 differs from the circuit A shown in Fig. 1 in the manner in which the tube K is connected between the bridge point D and the primary coil 7 of the transformer J. In Fig. 2 the cathode of the valve K is connected to the point D by a single bias resistance 32, and the anode of the triode valve and the anodes of the two diodes are all connected directly to the point C through the primary winding 7 of the transformer J and a conductor ca. The condenser 19 is connected between the points C and D. In Fig. 2, the conversion element G of Fig. 1 is replaced by a transformer PA which has its primary winding 33 in the measuring branch of the circuit network. The secondary winding 24' of the transformer PA has its terminals 25 connected to the input terminals of an amplifying and motor drive system controlling a rebalancing motor like the system H and motor I through which the secondary winding 24 of the transformer of Fig. 1 effects rebalancing operations.

The vibrator M of Fig. 2 intermittently connects the bridge circuit point E to the slider contact B through the winding 33 and thermocouple F, and to the bridge point D through the standard cell Sc and the primary winding 14 of the transformer O, the latter controlling the conductivity of the tube K. With the arrangement just described, the standard cell Sc is intermittently connected in shunt to the resistance 3 in the branch b of the bridge circuit. When so connected, the voltage of the standard cell is in bucking relation with the potential drop in the resistance 3. When said voltage and potential drop are unequal, the transformer O effects a corrective change in the conductivity of the tube K. Operation of the vibrator M also produces a pulsating current flow through the thermocouple F, analogous to that produced by the vibrator MA of Fig. 1. As previously explained, current flow through the thermocouple F and transformer primary winding 33 of Fig. 2 effects an adjustment of the slider contact B through the transformer secondary winding 24' exactly as the contact B of Fig. 1 is adjusted in response to the current flow through the winding 24 of the transformer p.

The general principle of the present invention may be utilized in bridge circuit energizing arrangements quite different in character from those shown in Figs. 1 and 2, as is illustrated by way of example in Fig. 3. The arrangement shown in Fig. 3 comprises a bridge circuit A including branches a and b which are connected to an energizing branch at points C and D as in Figs. 1 and 2. In Fig. 3 the points C and D are connected by conductors 40 and 41, respectively, to conductors 42 and 43 included in an energizing network. A predetermined, substantially constant potential difference between the conductors 42 and 43 is created by maintaining a predetermined, substantially constant unidirectional current flow through fixed resistors R and R' connected in series between the conductors 42 and 43. To this end the conductors 42 and 43 are connected in the output circuit of a twin triode tube KA, which may be of the commercially available 7N7 type. The cathodes of the two valves in the tube KA are connected through the conductor 43 to the resistor R' and through the latter to the resistor R. The conductor 42 is grounded and the cathodes of the valves of the tube KA are thus connected to ground through the resistors R' and R. The anodes of the valves of the tube KA are connected to one terminal of the secondary winding 44 of a transformer JA which has its primary winding 45 connected across the supply conductor L' and L². The second terminal 44' of the winding 44 is connected to ground, and thereby to the conductor 42, to complete the output circuit of the tube KA.

The conductivity of the tube KA is varied to compensate for variations in the potential drop through the resistors R' and R by means including amplifying valves KB and KC and signal creating means responsive to a variation in the ratio of the potential drop in the resistor R to the voltage of a standard cell Sc. In the arrangement for the purpose shown in Fig. 3, the terminals of the standard cell are connected by a voltage divider resistance 46. The resistance is engaged intermediate its ends by an adjustable contact 47. The latter is connected to the vibrating armature or reed M³ of a vibrator MB. The latter includes a reed-vibrating electromagnet having its winding 48 connected across a secondary winding 49 of the transformer JA. The vibrator MB differs from the vibrator M previously described, in that the reed M³ vibrates between, and alternately engages, stationary contacts at opposite sides of the reed. The vibrator MB is therefore similar to the vibrator MA of Fig. 1. One of the stationary contacts is connected to the terminal 51 of the primary winding 50 of a transformer OA. The second stationary contact is connected to the second terminal 52 of the winding 50. The midpoint of the winding 50 is connected by the center tap conductor 53 to the positive terminal of the resistor R. The negative terminal of the resistor R is connected by a conductor 54 to the negative terminal of the standard cell Sc.

With the arrangement described, there will be a unidirectional current flow into the transformer primary winding 50, alternately through its terminals 51 and 52, whenever the potential drop in the resistor R is greater or less than the potential drop in the portion of the resistance 46 between the contact 47 and the conductor 54. When the contact 47 and the positive terminal of the resistor R are at the same potential, there is no current flow through either section of the winding 50. During periods in which there is current flow in the winding 50, alternating current is induced in the secondary winding 55 of the transformer OA. That current will be of the same frequency as the voltage across the supply conductors L' and L², and will be of one phase, or of a second phase displaced approximately 180° from said one phase, depending on whether the potential of the positive terminal of the resistor R is positive or negative relative to the potential of the contact 47.

The voltage induced in the transformer secondary winding 55 creates current flow in a closed circuit including the winding 55, a resistance 56 and a condenser 57. The latter is connected between one end of the winding 55 and one end of the resistance 56 remote from the conductor 42, to which the other ends of said winding and resistance are connected. The terminal of the resistance 56 connected to the condenser 57 is also connected to the control grid of the valve KB. The latter has its cathode connected to the gronded conductor 42. The anode of the valve KB is connected to the grounded conductor 42 through a condenser 58 and resistance 59, and is connected to the control grid of the valve KC by the condenser 58. The cathode of the valve KC is connected to the grounded conductor 42. The anode of the valve KC is connected to the grounded conductor 42 by condenser 60, resistance 61, conductor 62 and resistance 63, arranged in series in the order stated. The conductors 42 and 62 are also connected by a condenser 64 in parallel with the resistance 63. The anode of the valve KC is connected through the condenser 60 to the control grids of the two valves of the tube KA.

Unidirectional current is supplied to the anode circuits of the valves KB and KC by a voltage source Q, which may be a battery in some cases, but as diagrammatically indicated in Fig. 3, the device Q is a rectifier having its input terminals connected to the supply conductors L' and L². The negative output terminal of the device Q is connected to the conductor 62, and the positive output terminal of the device Q is connected by conductor 65 and resistance 66' to the anode of the valve KC, and is connected by that conductor and resistances 66 and 66'' to the anode of the valve KB. The junction of the resistances 66 and 66'' is connected to ground by a condenser 68, and the conductor 65 is connected to ground by a condenser 67. The condensers 67 and 68 and resistance 66 provide a filter action having a ripple-eliminating effect on the current flow through the valve KC, and a somewhat greater ripple-eliminating effect on the current flow through the valve KB. In addition to its previously mentioned secondary windings 44 and 49, the transformer JA, as shown, has a third secondary winding 69 supplying heating current to the cathode heating elements of the tubes KA, KB and KC. A condenser 70 connected between the conductors 42 and 43 smooths out the current flowing in series through resistors R' and R.

The measuring circuit of Fig. 3, and the means through which the contact B is given rebalancing adjustments on current flow through the measuring branch may take various forms. As diagrammatically illustrated in Fig. 3, the measuring branch includes a thermocouple F whose voltage is to be measured, and current flow through the thermocouple produces rebalancing adjustments of the contact B through a current responsive element G, a voltage amplifier and motor drive section H, and a reversible rebalancing motor I like the correspondingly designated elements G, H and I of Fig. 1.

Notwithstanding the differences in form and arrangement between the apparatus diagrammatically illustrated in Figs. 1 and 3, the general operation of the apparatus shown in Fig. 3 is like that of the apparatus shown in Fig. 1, as has been made apparent in the foregoing references to Fig. 3. In the multi-stage amplifier shown in Fig. 3, as in the single stage amplifier shown in Figs. 1 and 2, the amplitude of current output of the amplifier is varied by current flow through the winding 50, and in accordance with the direction of said current flow, whenever the difference between the standard cell voltage and the potential across the resistance R is varied by a change in the amplitude of the current which energizes the measuring circuit.

As will be apparent, however, the conjoint use of the valves KA, KB and KC provides an amplifying means having a higher amplification factor or gain than that of the valve K of Fig. 1 or Fig. 2, and, hence, permits of a somewhat closer and more positive control of the bridge energizing current than is practically obtainable with the arrangement shown in Fig. 1, or with the arrangement shown in Fig. 2. With the apparatus shown diagrammatically in Fig. 3, the potential drop in the resistance R can be kept from varying more than one or two hundredths of one per cent of the potential difference between the negative terminal of the standard cell Sc and the contact 47, by arranging the amplifying system including the valves KB, KC and KA to have a gain of one thousand, or five hundred, respectively. It is practically feasible to obtain a gain of one thousand with the arrangement shown.

Each of the circuit networks shown in Figs. 1, 2 and 3 includes means for determining whether the current flow through the bridge circuit A included in the network is or is not at a predetermined value. The means for this purpose included in the different networks are generically alike, in that in each network a standard cell is connected in a network branch which also includes means responsive to current flow in said branch, and is in parallel with a network portion which includes some at least of the fixed resistance in the corresponding bridge circuit. Thus in Fig. 1, the network branch including the standard cell Sc is connected in parallel with the network portion between the points C and d, which includes the entire bridge circuit, and also includes the resistance 13 in series with the bridge circuit. In Fig. 2 the network branch including the standard cell Sc is connected in parallel with the portion of the network formed by the bridge circuit resistor 3. In Fig. 3 the standard cell Sc and the resistors R and R' in series collectively form a network branch parallel with the network portion formed by the bridge circuit A.

The arrangements shown in Figs. 1, 2 and 3 are all alike also, in that the branch of each network which includes the standard cell Sc includes in series therewith a vibrator switch M, MA or MB and the primary winding of a transformer O or OA, the latter having a secondary winding included in the input circuit of an electronic amplifier, and in that the output circuit of said amplifier includes the bridge circuit and a source of bridge energizing current.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. The combination with a resistance, of means for maintaining a unidirectional current flow of approximately constant magnitude through said resistance, comprising a circuit network including terminals adapted to be connected to a source of current and an electronic valve connected in series with said resistance and terminals, whereby a voltage drop is adapted to be produced in said resistance, a circuit portion including a source of standard voltage through which a current flow is produced by variations in the voltage drop in said resistance relative to said standard voltage in one direction or in the opposite direction in selective accordance with the character of said variations, and means responsive to variations in the voltage drop in said resistance relative to said standard voltage for regulating the current flow through said valve.

2. In measuring apparatus, the combination with a bridge circuit, of energizing means therefor comprising a circuit network including terminals adapted to be connected to a source of current and an electronic amplifier of variable conductivity and connected in series with said terminals and circuit, whereby a voltage drop is adapted to be produced in said circuit, a circuit portion including a source of standard voltage through which a current flow is produced by variations in the voltage drop in said resistance relative to said standard voltage in one direction or in the opposite direction in selective accordance with the character of said variations, and means responsive to variations in the voltage drop in said bridge circuit relative to said standard voltage for varying the conductivity of said electronic amplifier.

3. In measuring apparatus, the combination in a circuit network including a bridge circuit, of terminals adapted to be connected to a source of current, an electronic amplifier including a control electrode and having input and output circuits, said output circuit including said terminals and said bridge circuit, whereby a voltage drop is adapted to be produced in said bridge circuit, and said input circuit including said control electrode, a circuit portion including a source of standard voltage through which a current flow is produced by variations in the voltage drop in said resistance relative to said standard voltage in one direction or in the opposite direction in selective accordance with the character of said variations, and means responsive to variations in the difference between the voltage drop in said bridge circuit and said standard voltage for impressing a control signal on said input circuit.

4. The combination with a resistance, of means for maintaining a unidirectional current flow of approximately constant magnitude through said resistance comprising a circuit network including terminals adapted to be connected to a source of alternating current, an electronic valve through which said terminals pass rectified current through said resistance, whereby a voltage drop is adapted to be produced in said resistance, a circuit portion including a source of standard voltage through which a current flow is produced by variations in the voltage drop in said resistance relative to said standard voltage in one direction or in the opposite direction in selective accordance with the character of said variations, and means responsive to variations in the voltage drop in said resistance relative to said standard voltage for regulating the current flow through said valve.

5. In measuring apparatus, the combination with a bridge circuit, of means for energizing and continuously standardizing said circuit, comprising a circuit network including terminals adapted to be connected to a source of current, an electronic amplifying valve, means connecting said terminals and valve in series, whereby a potential drop is adapted to be produced in said bridge circuit, a circuit portion including a source of standard voltage through which a current flow is produced by variations in the voltage drop in said resistance relative to said standard voltage in one direction or in the opposite direction in selective accordance with the character of said variations, and means responsive to the difference between said standard voltage and the potential drop in said bridge circuit for varying the conductivity of said valve.

6. The combination with a resistance, of means for maintaining a unidirectional current flow of approximately constant magnitude through said resistance, comprising a circuit network including terminals adapted to be connected to a source of current and an electronic amplifier connected in series with said resistance, a transformer having primary and secondary windings, and a constant voltage source, a current interrupting vibrator and said transformer primary winding connected in series between points of said network which differ in potential as a result of current flow through said resistance by an amount which is equal to the voltage of said voltage source when said current is of predetermined magnitude and which is varied by changes in the magnitude of said current, and means including said transformer for varying the conductivity of said amplifier thereby to minimize variations in said current.

7. In measuring apparatus, the combination with a bridge circuit including a slide wire resistance, of means for energizing and continuously standardizing said circuit, comprising a circuit network including terminals adapted to be connected to a source of alternating current and an electronic amplifying valve connected in series with, and passing a rectified current through, said slide wire resistance of a magnitude depending on the conductivity of said valve, and means responsive to the magnitude of said current for increasing or decreasing the conductivity of said valve as said energizing current falls below or rises above a predetermined value thereof, said means comprising a circuit portion through which different variations in the magnitude of said current produce current flow in one direction or the other depending on the character of said variations.

8. In measuring apparatus, the combination with a bridge circuit, of means for energizing and continuously standardizing said circuit, whereby a potential drop is adapted to be produced in said circuit, comprising a circuit network including an amplifier having an output circuit including said bridge circuit and having an input circuit, a circuit portion including a source of standard voltage through which a current flow is produced by variations in the voltage drop in said resistance relative to said standard voltage in one direction or in the opposite direction in selective accordance with the character of said variations, and means for creating a voltage signal varying with variations in the ratio of said standard voltage to the potential drop in said bridge circuit and for impressing said signal on the input circuit of said amplifier.

9. In a measuring circuit network, the combination with a bridge circuit including resistance, of means for energizing and continuously standardizing said circuit, comprising terminals adapted to be connected to a current source, a transformer having a primary winding and a secondary winding, an electronic amplifier which has an output circuit including said bridge circuit and terminals and which has an input circuit including said secondary winding, and the conductivity of which is selectively dependent on the direction and magnitude of current flow through said secondary winding, and means for creating current flow in said secondary winding comprising a standard voltage source and a vibrator connected in series with said primary winding in a branch of said network in parallel with a network portion including some at least of said bridge circuit resistance and in which there is a potential drop which does or does not balance the voltage of said standard voltage source accordingly as the current flow through the bridge circuit is or is not at a predetermined normal value.

10. In measuring apparatus, the combination with a bridge circuit including a slide wire resistance, a slider contact engaging said resistance, terminals adapted to be connected to a source of current, a transformer having primary and secondary windings, an electronic amplifier having an output circuit including said terminals and said bridge circuit, and having an input circuit including the secondary winding of said transformer, a vibrator and a standard cell connected in series with the primary winding of said transformer between points of said bridge circuit differing in potential from one another by an amount depending on the current flow through the bridge circuit, a source of voltage to be measured and a second transformer having primary and secondary windings, said source of voltage to be measured and the primary of said second transformer and said vibrator being connected in series between one of the above mentioned points and said slider contact, and rebalancing mechanism actuated by current flow in the secondary winding of said second transformer to adjust said slider contact into a position along said slide wire resistance in which position current ceases to flow through the secondary winding of said second transformer.

11. In measuring apparatus, the combination with a self-balancing network having energizing terminals and including a source of voltage to be measured, supply terminals adapted to be connected to a source of current, a transformer having primary and secondary windings, an electronic amplifier having an output circuit including said supply terminals and the energizing terminals of said network, and having an input circuit including the secondary winding of said transformer, a vibrator and a standard cell connected in series with the primary winding of said transformer between points of said network differing in potential from one another by an amount depending on the current flow between the energizing terminals of said network, a second transformer having primary and secondary windings, said source of voltage to be measured and the primary of said second transformer and said vibrator being connected in series between one of the above mentioned points and another point of said network which is of the same potential as said one point when said network is balanced, and rebalancing mechanism actuated by current flow in the secondary winding of said second transformer to adjust the potential of said another point to reduce the current flow through the secondary winding of said second transformer.

12. In measuring apparatus, the combination with a self-balancing network having energizing terminals and including a source of voltage to be measured, supply terminals adapted to be connected to a source of current, a transformer having primary and secondary windings, an electronic amplifier having an output circuit including said supply terminals and the energizing terminals of said network, and having an input circuit including the secondary winding of said transformer, and a vibrator connected in series with the primary winding of said transformer between points of said network differing in potential from one another by an amount depending on the current flow between the energizing terminals of said network, a second transformer having primary and secondary windings, said source of voltage to be measured and the primary of said second transformer and said vibrator being connected in series between one of the above mentioned points and another point of said network which is of the same potential as said one point when said network is balanced, and rebalancing mechanism actuated by current flow in the secondary winding of said second transformer to adjust the potential of said another point as required to maintain said network balanced.

13. In measuring apparatus, the combination with two balanceable electrical circuits in each of which upon unbalance an unbalance current having a frequency difficult of amplification is established, said circuits having a common conductor through which both unbalance currents flow, means connected in said common conductor and cooperating with other means connected in each of said circuits to translate each of said unbalance currents into a current of a frequency which can be readily amplified, means to amplify each of said currents at said frequency, means to apply one of said amplified currents to effect a balance of the associated one of said circuits, and means to apply the other of said amplified currents to effect a balance of the other circuit.

14. In measuring apparatus, the combination with two balanceable electrical circuits in each of which upon unbalance an unbalance unidirectional current flow is established, said circuits having a common conductor through which said unbalance currents flow, means connected in said common conductor and cooperating with other means connected in each of said circuits to translate each of said unbalance currents into an alternating current, means responsive to one of said alternating currents and operative to effect a balance of the associated one of said circuits, and means responsive to the other of said alternating currents and operative to effect a balance of the other circuit 15. In a measuring circuit network, the combination with a bridge circuit, of means for energizing and continuously standardizing said circuit, comprising terminals adapted to be connected to a current source, a transformer having a primary winding and a secondary winding, an electronic amplifier which has an output circuit including said bridge circuit and said terminals and which has an input circuit including said secondary winding, the conductivity of said amplifier being selectively dependent on the direction and magnitude of current flow through said secondary winding, and means for creating current flow in said secondary winding when the current flow through the bridge circuit is not at a predetermined normal value, comprising a circuit network portion connected in parallel with said bridge circuit and including a resistance, a standard cell having one terminal connected to one end of said resistance and a connection between the second terminal of said standard cell and the second end of said resistance, said connection including the primary winding of said transformer, two stationary contacts, one connected to one end and the other connected to the second end of said primary winding, the midpoint of said primary winding being connected to the second end of said resistance, and a vibrating contact connected to the second terminal of said standard cell and arranged for vibration back and forth between one position in which it engages one of said stationary contacts and a second position in which it engages the second of said stationary contacts.

16. In a measuring circuit network, the combination with a bridge circuit, of means for energizing and continuously standardizing said circuit, comprising terminals adapted to be connected to a current source, a transformer having a primary winding and a secondary winding, an electronic amplifier which has an output circuit including said bridge circuit and said terminals and which has an input circuit including said secondary winding, the conductivity of said amplifier being selectively dependent on the direction and magnitude of current flow through said secondary winding, and means for creating current flow in said secondary winding when the current flow through the bridge circuit is not at a predetermined normal value, comprising a circuit network portion connected in parallel with said bridge circuit and including a first resistance, a standard cell having one terminal connected to one end of said resistance, a second resistance connecting the terminals of said standard cell, and a connection between a variable intermediate point of said second resistance and the second end of said first resistance, said connection including the primary winding of said transformer, two stationary contacts, one connected to one end and the other connected to the second end of said primary winding, the midpoint of said primary winding being connected to the second end of said first resistance, and a vibrating contact connected to said intermediate point of said second resistance and arranged for vibration back and forth between one position in which it engages one of said stationary contacts and a second position in which it engages the second of said stationary contacts.

17. In a potentiometer having a bridge circuit including a slide wire resistance across which a predetermined voltage is applied and having means for opposing a portion of said voltage to a minute voltage of the order of magnitude of that generated by a thermocouple, the improvement comprising means for energizing and continuously standardizing said circuit, comprising terminals adapted to be connected to a source of current and an electronic amplifying valve connected in series with, and passing a current through, said slide wire resistance of a magnitude depending on the conductivity of said valve, said electronic amplifying valve having a control portion operative to control the conductivity of the valve, and controlling means having an input portion connected to said slide wire resistance, having an output portion connected to said control portion, and operative to apply to the latter an alternating voltage signal a characteristic of which is modified in accordance with changes in the magnitude of said current for increasing or decreasing the conductivity of said valve as said current falls below or rises above a predetermined value thereof.

WALTER P. WILLS.

REFERENCES CITED

The following references are of record in the file of this patent:

UNITED STATES PATENTS

| Number | Name | Date |
| --- | --- | --- |
| 1,438,976 | Wold | Dec. 19, 1922 |
| 2,268,790 | White | Jan. 6, 1942 |
| 2,297,836 | Levy | Oct. 6, 1942 |
| 2,423,114 | Potter | July 1, 1947 |

OTHER REFERENCES

"Current Stabilizers," proceedings of the I. R. E., volume 32, No. 7, July 1944, pp. 415–418.